United States Patent
Yu et al.

(10) Patent No.: US 10,041,735 B2
(45) Date of Patent: Aug. 7, 2018

(54) BAKING DEVICE FOR LIQUID CRYSTAL ALIGNMENT FILMS

(71) Applicant: SHENZHEN CHINA STAR OPTOELECTRONICS TECHNOLOGY CO., LTD., Shenzhen, Guangdong (CN)

(72) Inventors: Wei Yu, Shenzhen (CN); Chang Chengmr Lo, Shenzhen (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 126 days.

(21) Appl. No.: 14/240,343

(22) PCT Filed: Jan. 23, 2014

(86) PCT No.: PCT/CN2014/071238
§ 371 (c)(1),
(2) Date: Feb. 21, 2014

(87) PCT Pub. No.: WO2015/032183
PCT Pub. Date: Mar. 12, 2015

(65) Prior Publication Data
US 2015/0153105 A1 Jun. 4, 2015

(30) Foreign Application Priority Data
Sep. 9, 2013 (CN) .......................... 2013 1 0408386

(51) Int. Cl.
*F27D 5/00* (2006.01)
*G02F 1/1337* (2006.01)
*G02F 1/13* (2006.01)

(52) U.S. Cl.
CPC ............. *F27D 5/00* (2013.01); *G02F 1/1303* (2013.01); *G02F 1/1337* (2013.01)

(58) Field of Classification Search
CPC ......... F27D 5/00; G02F 1/1303; G02F 1/1337
(Continued)

(56) References Cited

U.S. PATENT DOCUMENTS

| 6,178,361 | B1* | 1/2001 | George | H01L 21/6719 414/217 |
| 2003/0092282 | A1* | 5/2003 | Kim | C23C 16/4581 438/729 |

(Continued)

FOREIGN PATENT DOCUMENTS

| CN | 103454810 A | | 12/2013 |
| KR | 2002-0056097 A | | 7/2002 |
| KR | 20020056097 A | * | 7/2002 |

OTHER PUBLICATIONS

English Translation of (KR 20020056097 A).*
International Search Report dated May 28, 2014, issued to International Application No. PCT/CN2014/071238.

*Primary Examiner* — Alissa Tompkins
*Assistant Examiner* — Benjamin W Johnson
(74) *Attorney, Agent, or Firm* — Kim Winston LLP

(57) ABSTRACT

The present disclosure provides a baking device for liquid crystal alignment films, wherein the baking device includes a heating table with openings and lift pins extending and penetrating through the openings, and the lift pins can move between a retracting position and a stretching position to support a glass substrate coated with alignment films, wherein a blocking member is arranged on the lift pin in a surrounding manner to be tightly engaged thereon, so as to block the air stream flowing toward the glass substrate through the openings when the lift pins are situated in the retracting position. With the provision of the blocking members, the air streams flowing toward the glass substrate coated with alignment films can be resisted in the baking (Continued)

process, which prevents the air streams from affecting heat distribution and temperature distribution.

4 Claims, 3 Drawing Sheets

(58) Field of Classification Search
USPC .................. 432/253, 254.1; 118/728, 729
See application file for complete search history.

(56) References Cited

U.S. PATENT DOCUMENTS

| 2004/0045509 A1* | 3/2004 | Or | C23C 16/4401 |
| | | | 118/729 |
| 2005/0150462 A1* | 7/2005 | Seo | C23C 16/4404 |
| | | | 118/728 |
| 2010/0101491 A1* | 4/2010 | Aida | H01L 21/68742 |
| | | | 118/502 |

* cited by examiner

BAKING DEVICE FOR LIQUID CRYSTAL ALIGNMENT FILMS

FIELD OF THE INVENTION

The present disclosure relates to the process for manufacturing liquid crystal display panels, and particularly relates to a baking device for liquid crystal alignment films.

BACKGROUND OF THE INVENTION

With its rapid development, the LCD technology has been widely used in all aspects of daily life. There have been considerable markets for LCD panels in information household appliances, such as liquid crystal screens, portable audio-video products of consumption type, mobile phones, liquid crystal televisions and the like, not to mention its traditional application to notebook computers (NB). Although the picture quality of LCD screens is closer to that of the completely developed cathode-ray tube (CRT) screens, there are still some problems of visual angle, contrast, display uniformity and the like in LCD screens, which need to be improved. Furthermore, in regard to the applications concerning high-density, highly refined and large-sized products, such as liquid crystal televisions, there are also problems desired to be solved with response speed and color reproducibility in LCD screens. The techniques concerning the control of liquid crystal alignment and the alignment films are closely related to the above-mentioned problems in liquid crystal panels. Therefore, manufacturing and controlling the alignment films are quite important.

FIG. 1 shows a schematic diagram of a cross section of a liquid crystal display 10 in the prior art, wherein alignment films 7 are located between a liquid crystal 6 and transparent electrodes 3 and 4. The importance of the alignment films 7 is due to the working principle of the liquid crystal display 10. The liquid crystal 6 can be applied to a screen, as the dielectric constants of the liquid crystal 6 in the direction parallel with the molecules and those in the direction perpendicular to the molecules are different, whereby the liquid crystal can be driven through an electric field. On the other hand, the liquid crystal also has a refractive index varied according to the orientations of the molecules, i.e. exhibits a birefringence effect, which will change the polarizing direction of polarized light. A strong anchoring strength exists on the interfaces between the liquid crystal 6 and the alignment films 7, and the liquid crystal 6 is restored to its original arrangement by means of elasticity, i.e. restoring force, after the electric field is turned off. Therefore, as is clearly evident, the liquid crystal 6 cannot function in the absence of the alignment films 7.

The LCD panel manufacturing technology is becoming increasingly mature. With reference to FIG. 1, at present, an active TFT array substrate 1 with patterns and a color filter (CF) substrate 2 are generally first manufactured. An alignment film 7 is then coated on the inner surface of each of the active TFT array substrate 1 and the color filter substrate 2. After heating and baking of the alignment films 7, the TFT array substrate 1 and the color filter substrate 2 are adhered together with a sealant 5, and liquid crystal 6 is filled into the space encompassed by the sealant 5, the TFT array substrate 1 and the color filter substrate 2. The alignment films 7 are used for the alignment of the liquid crystal 6, thus if the alignment films 7 are not heated uniformly during the baking, the alignment of the liquid crystal 6 would be disrupted, which ultimately leads to a Mura phenomenon on display panels.

FIG. 2 schematically shows a glass substrate 11 located in a baking device. FIG. 3 shows a front view of a baking device 20 for liquid crystal alignment films in the prior art. With reference to FIG. 2 and FIG. 3, a commonly-used prebake oven 20 performs heating with a heating table 15 provided with openings. Positions 17 on the treated glass substrate 11, to which the openings of the heating table 15 correspond respectively, are indicated by circles in FIG. 2. Lift pins 13 pass through the openings, and the lift pins 13 can move between a stretching position and a retracting position to support the treated glass substrate 11, which is coated with the alignment films. The glass substrate 11 is fetched and fed by a manipulator and is then processed with the ascending and descending of the lift pins 13.

The lift pins 13 are situated in their retracting positions in FIG. 3. When the lift pins 13 are located at the retracting positions and the glass substrate 11 is being processed, due to the openings on the heating table 15, air streams 14 can reach the bottom side surface of the glass substrate 11, i.e. the side surface of the glass substrate 11 facing the heating table 15, through the openings, which will cause temperature difference between the openings 17 and areas without such openings on the glass substrate 11. Inevitably, most of the openings through which the lift pins 13 can pass may correspond to display areas 12 on the glass substrate 11, which causes non-uniform heating of the alignment films and thus the Mura phenomenon on the whole display panel.

SUMMARY OF THE INVENTION

As mentioned above, there are certain defects in the prior art. For example, a baking device for alignment films is provided with openings through which lift pins pass, while air streams flow to the treated glass substrate through the openings during the baking of the alignment films, so that the alignment films are not heated uniformly, and temperature difference occurs between the positions corresponding to the openings and the other positions on the glass plate. This causes non-uniform properties of the alignment films, and thus color non-uniformity of a finished display panel. Aiming at these defects, the present disclosure provides a baking device for liquid crystal alignment films.

The present disclosure provides a baking device for liquid crystal alignment films. In a first embodiment, the baking device includes a heating table with openings and lift pins, each of which extends through a corresponding opening and thus can move between a retracting position and a stretching position to support a glass substrate coated with alignment films, wherein a blocking member is arranged on each lift pin in a surrounding manner to be tightly engaged thereon, so as to block the air stream flowing toward the glass substrate through the corresponding opening when said lift pin is situated in the retracting position. With the provision of the blocking members, the air streams flowing toward the glass substrate coated with alignment films can be resisted in the baking process, which prevents the air streams from affecting heat distribution and temperature distribution. Therefore, a balanced temperature can be maintained over the whole glass substrate in the baking process, which prevents the alignment films from being heated non-uniformly, i.e. solves the problem of color non-uniformity, which is to say that the finally obtained display panel possesses a uniform optical property and thus desired displayed pictures.

In a second embodiment improved based on the first embodiment, the blocking member is in contact with the surface of the heating table facing the glass substrate to block the corresponding opening when said lift pin is situated in the retracting position. At this moment, the blocking members can stop the air streams in order to avoid influence on temperature and heat distribution, and can also function as a limit simultaneously. The distance between the bottom surface of the blocking member and the top end of the respective lift pin equals exactly to the distance between the bottom surface of the glass substrate and the surface of the heating table in the baking process.

In a third embodiment improved based on the first or second embodiment, the blocking member includes a circular plate body. The circular plate bodies help to save materials, are easiest to manufacture, and can effectively function to achieve the objectives of the present disclosure, namely blocking the openings of the heating table and resisting the air streams flowing toward the treated glass substrate.

In a forth embodiment improved based on the first embodiment, the blocking member includes a truncated cone, the area of the surface of which facing the heating table is smaller than that of the surface of the same facing the glass substrate, and the area of the surface of the truncated cone facing the heating table is smaller than that of the cross section of the opening. At this moment, a portion of the truncated cone in contact with the heating table to block the opening lies on its lateral circumferential surface. In this embodiment, the blocking member shaped into a truncated cone is divided into two parts, with one above the surface of the heating table and the other inside the opening, which performs a double resisting of the air streams. This solution has relatively low requirement for process errors and better blocking effect.

In a fifth embodiment improved based on the forth embodiment, a guide angle is formed at the end of the opening facing the glass substrate, and the degree of the guide angle relative to the horizontal surface is equal to the degree of the slant angle of the side surface of the truncated cone relative to the horizontal surface. Thus, the side surfaces of the truncated cones can be jointed with the heating table in larger areas, which benefits the blocking of the openings, the locating of the truncated cones and the limiting of the lift pins.

In a sixth embodiment improved based on one of the first to fifth embodiments, the blocking member and the respective lift pin are connected with a threaded connection. Threaded connection structures are easy to manufacture and cost saving. Meanwhile, free assembly, expedient maintaining and batch production can be easily achieved.

In a seventh embodiment improved based on one of the first to fifth embodiments, the lift pin and the respective blocking member are formed as an integral through injection molding. Due to an integrated injection molding, the procedures are simplified, and the blocking members can be firmly fixed to the lift pins respectively without position deviations, regardless of the running-in problem during the mechanical process.

In an eighth embodiment improved based on one of the first to seventh embodiments, the blocking member is made of the same material as the heating table. Therefore, consistent thermal properties are ensured between the blocking members and the heating table, and thus temperature uniformity can be achieved between the positions corresponding to the openings and the other positions over the whole glass substrate.

In a ninth embodiment improved based on one of the first to eighth embodiments, the blocking member is made of a metal material. A metal material has good thermal conductivity, as a result of which heat energy can be transferred through it at a relatively high speed, and this further ensures temperature uniformity and effectively prevents color non-uniformity on the display panel. Moreover, due to the higher hardness of a metal material, the blocking members can also function as a stop limit. On account of good thermal property and physical property of the metal material, the blocking members can be appropriate for both the thermal design and the mechanical design of the baking device.

In a tenth embodiment improved based on the third embodiment, the radius of the circular plate body ranges from 1.2 to 1.5 times that of the respective opening. In this solution, the opening is advantageously blocked with the required blocking tightness and reduced raw materials or manufacturing procedures.

The above-mentioned technical features may be combined together in various appropriate manners or substituted by equivalent technical features, as long as the objectives of the present disclosure can be fulfilled.

BRIEF DESCRIPTION OF THE DRAWINGS

The present disclosure will be described in more detail below based on merely illustrative examples with reference to the accompanying drawings, in which.

Figure 1:
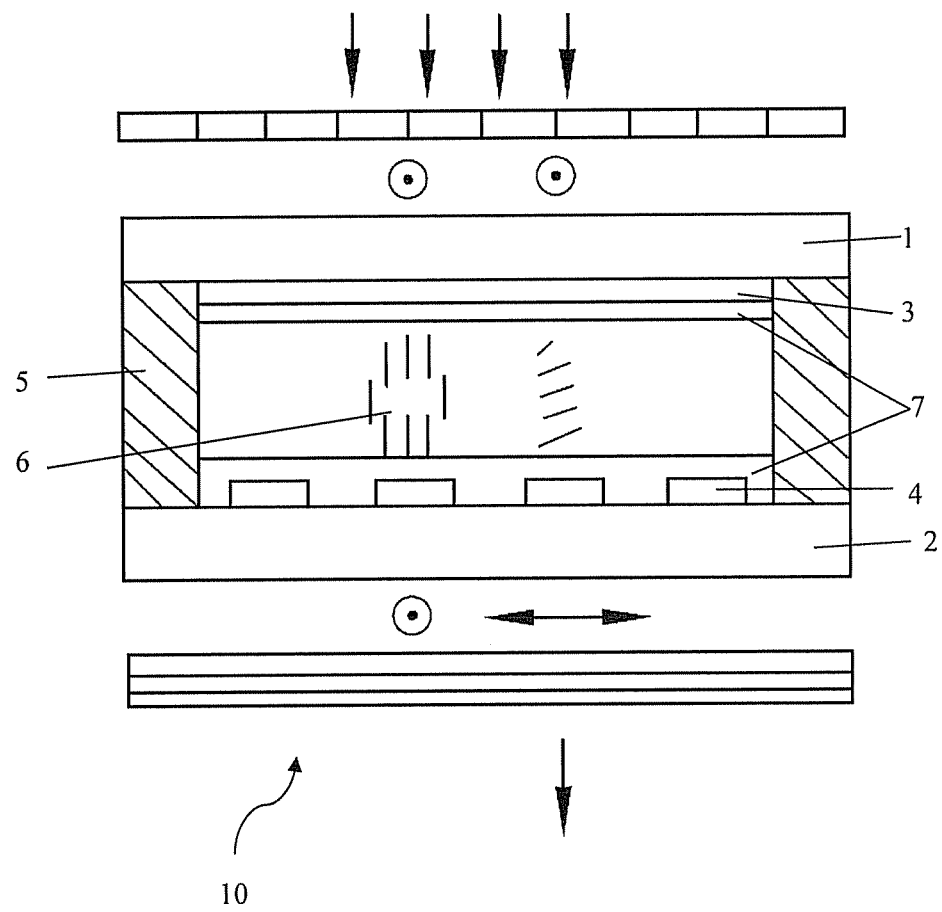
FIG. 1 shows a section view of an LCD panel in the prior art.
Figure 2:
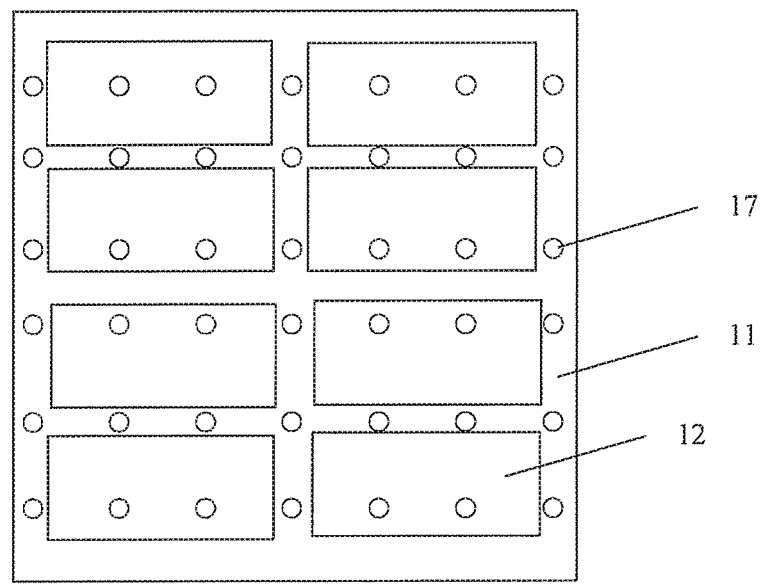
FIG. 2 shows a glass substrate situated in a baking device.
Figure 3:
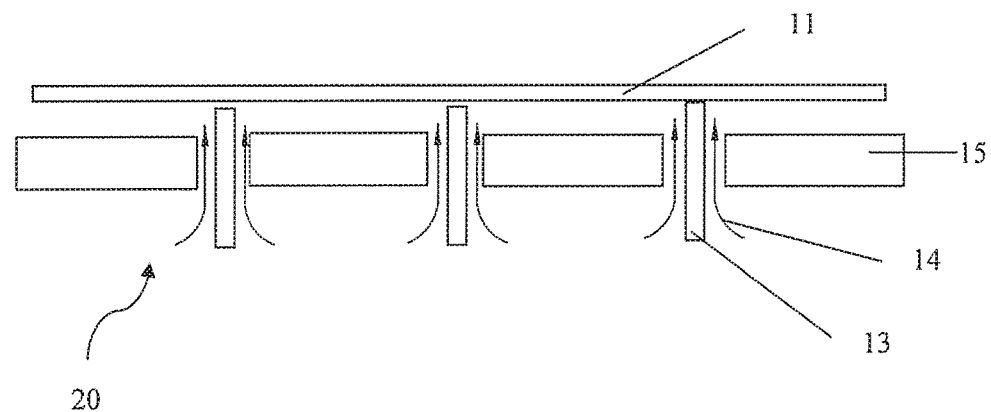
FIG. 3 shows a front view of a baking device for liquid crystal alignment films in the prior art, wherein lift pins are situated in a retracting position.

In the drawings, similar components are marked with similar reference signs. The accompanying drawings are not drawn to actual scale.

DETAILED DESCRIPTION OF THE EMBODIMENTS

The present disclosure will be introduced in detail below with reference to the accompanying drawings.

Figure 4:
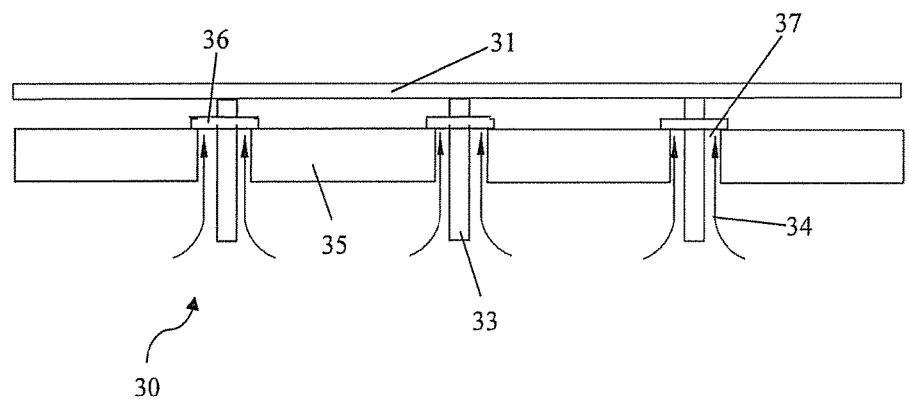
FIG. 4 shows a front view of a baking device for liquid crystal alignment films according to the present disclosure, wherein lift pins are situated in a retracting position.
Figure 5:
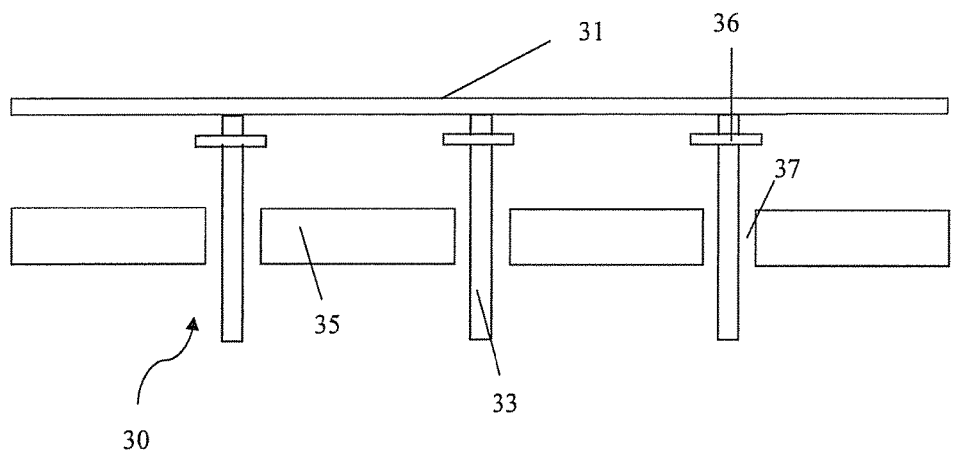
FIG. 5 shows a front view of the baking device for the liquid crystal alignment films according to the present disclosure, wherein lift pins are situated in a stretching position.

FIG. 4 and FIG. 5 show front views of a baking device 30 for liquid crystal alignment films according to the present disclosure. With reference to FIG. 4, the baking device 30 for liquid crystal alignment films according to the present disclosure includes a heating table 35 with openings 37 and lift pins 33 extending through the openings 37, wherein the lift pins 33 can move between a retracting position (see FIG. 4) and a stretching position (see FIG. 5) to support a glass substrate 31 coated with the alignment films. A blocking member 36 is arranged on the lift pin 33 in a surrounding manner to be tightly engaged thereon, so as to resist the air stream 34 flowing toward the glass substrate 31 through the openings 37 when the lift pins 33 are situated in the retracting position.

With reference to FIG. 4, when the lift pins 33 are situated in the retracting position, the heating table 35 performs a baking process on the glass substrate 31, and at this moment, the blocking member 36 is in contact with the surface of the heating table 35 facing the glass substrate 31, in order to block the respective opening 37. The blocking members 36 can also function as a stop limit. The distance between the bottom surface of the blocking member 36 and the top end of the respective lift pin 33 equals exactly to the distance between the bottom surface of the glass substrate 31 and the surface of the heating table 35 in the baking process. Meanwhile, with the blocking members 36 blocking the openings 37, the air streams 34 from the lower portion can be obstructed before reaching the glass substrate 31. Thus, the temperatures in the areas of the glass substrate 31 corresponding to the openings 37 of the heating table 35 are free from the disrupting influence of air streams 34, and thus are kept consistent with those in other areas. Therefore, non-uniform processing, which leads to non-uniform properties of the glass substrate 31, can be avoided, which helps to overcome the Mura phenomenon on the finally obtained display panels.

Preferably, the blocking members 36 are made of the same material as the heating table 35. Therefore, consistent thermal properties are ensured between the blocking members 36 and the heating table 35, and thus temperature uniformity can be achieved between the positions corresponding to the openings 37 and the other positions over the whole glass substrate.

The blocking members 36 are preferably made of a metal material. A metal material has good thermal conductivity, as a result of which heat energy can be transferred through it at a relatively high speed, and this further ensures temperature uniformity and effectively prevents color non-uniformity on the display panel. Moreover, due to the higher hardness of a metal material, the blocking members 36 can also function as a stop limit. On account of good thermal property and physical property of the metal material, the blocking members 36 can be appropriate for both the thermal design and the mechanical design of the baking device 30.

With reference to FIG. 4 and FIG. 5, the blocking member 36 can include a circular plate body. The circular plate body is perpendicular to the respective lift pin 33, for example. The radius of the circular plate body can range from 1.2 to 1.5 times that of the opening 37 on the heating table 35. In this case, the opening 37 can be better blocked.

In a further embodiment, the blocking member 36 includes a truncated cone, the longitudinal axis of which is parallel to the corresponding lift pin 33, wherein the area of the surface of the truncated cone facing the heating table 35 is smaller than that of the surface of the truncated cone facing the glass substrate 31. For example, the radius of the cross section of the truncated cone can be gradually reduced from top to bottom, and the area of the surface of the truncated cone facing the heating table 35 is smaller than that of the cross section of the respective opening 37. Thus, when the lift pins 33 are situated in the retracting position, the side wall of the blocking member 36, i.e. the truncated cone, abuts against the edge of the respective opening on the surface of the heating table 35. In this embodiment, the blocking member 36 is divided into two parts, with one above the heating table 35 and the other inside the respective opening 37, to realize a double resisting of the air stream 34. This solution has relatively low requirement for process errors and better blocking effect.

Further, a guide angle is formed at the end of the opening 37 facing the glass substrate 31, and the degree of the guide angle relative to the horizontal surface equals to the degree of the slant angle of the side surface of the truncated cone relative to the horizontal surface. Thus, the side surfaces of the truncated cones can be jointed with the heating table 35 in larger areas, which benefits the blocking of the openings 37, the locating of the truncated cones and the limiting of the lift pins 33.

The blocking member 36 and the respective lift pin 33 can be connected with a threaded connection. A threaded connection structure is easy in manufacture and low in cost. Meanwhile, free assembly, expedient maintaining and batch production can be easily achieved.

However, other connecting means may also be adopted between the blocking members 36 and the lift pins 33. For example, the lift pin 33 can be provided with an annular groove on its outer surface, and the inner surface of the blocking member 36 can be embedded into the groove to form a tongue and groove connection.

The lift pin 33 and the respective blocking member 36 can also be formed as an integral through injection molding. In this way, procedures are reduced, and the blocking members 36 can be firmly fixed to the lift pins 33 without position deviations, regardless of the running-in problem during the mechanical process.

Although the present disclosure has been described with reference to the preferred examples, various modifications could be made to the present disclosure without departing from the scope of the present disclosure and components in the present disclosure could be substituted by equivalents. The present disclosure is not limited to the specific examples disclosed in the description, but includes all technical solutions falling into the scope of the claims.

The invention claimed is:

1. A baking device for liquid crystal alignment films, including a heating table with openings and lift pins, wherein each lift pin extends through a corresponding opening and thus can move between a retracting position and a stretching position to support a glass substrate coated with alignment films,
    wherein a blocking member is arranged on each lift pin in a surrounding manner to be tightly engaged thereon, so as to block the air stream flowing toward the glass substrate through each corresponding opening when each corresponding lift pin is situated in the retracting position,
    wherein the blocking member arranged on each lift pin is in contact with a surface of the heating table facing the glass substrate to block each corresponding opening when each corresponding lift pin is situated in the retracting position,
    wherein each blocking member includes a circular plate body and the radius of each circular plate body ranges from 1.2 to 1.5 times that of each corresponding opening,
    wherein each blocking member is made of a metal material,
    wherein a distance between a bottom surface of each blocking member and a top end of each corresponding lift pin equals exactly to a distance between a bottom surface of the glass substrate and the surface of the heating table in a baking process,
    wherein each blocking member has a top surface and a bottom surface that have the same diameter, wherein the bottom surface of each blocking member is disposed completely above the heating table in both the stretching position and retracting position, and wherein the glass substrate is supported solely by the lift pins in both the stretching position and the retracting position.

2. The baking device according to claim 1, wherein each blocking member and its corresponding lift pin are connected with a threaded connection.

3. The baking device according to claim 1, wherein each lift pin and its corresponding blocking member are formed as an integral unit through injection molding.

4. The baking device according to claim 1, wherein each blocking member is made of the same material as the heating table.

\* \* \* \* \*